United States Patent
Kotzab

[19]

[11] Patent Number: 5,827,465
[45] Date of Patent: Oct. 27, 1998

[54] METHOD FOR TEMPERING AN INJECTION MOLDING TOOL

[76] Inventor: Werner Kotzab, Heinestrasse 7, D-97422 Schweinfurt, Germany

[21] Appl. No.: 571,435

[22] Filed: Dec. 13, 1995

[30]  Foreign Application Priority Data

Dec. 13, 1994 [DE] Germany .......................... 44 44 197.5

[51] Int. Cl.⁶ .................................................. B29C 45/73
[52] U.S. Cl. ..................................... 264/328.16; 425/552
[58] Field of Search .............................. 264/40.6, 328.14, 264/328.15, 328.16; 425/143, 144, 547, 548, 549, 552

[56]  References Cited

U.S. PATENT DOCUMENTS 5,423,670  6/1995  Hamel ..................................... 425/144

FOREIGN PATENT DOCUMENTS 43 09 880  9/1994  Germany .

OTHER PUBLICATIONS

Rosato et al., Injection Molding Handbook, pp. 189–196, 1986.

*Primary Examiner*—Jill L. Heitbrink
*Attorney, Agent, or Firm*—Browdy and Neimark

[57]  ABSTRACT

In a method for tempering an injection molding tool having a plurality of cooling conduits, in which a coolant liquid can be introduced in controlled fashion, wherein the injection molding tool has a mold recess into which molten molding composition is injected during an injection cycle and is ejected after solidifying, it is provided in order to optimize the heat dissipation that the cooling conduits are positioned parallel relative to the closest wall of the mold recess in such a way that the thermal energy to be dissipated in the injection cycle, resulting from the sum of the thermal energy of the part to be molded and heat exchange with the surroundings of the tool and the externally supplied energy, can be carried away maximally in the time of the heat transfer from the melt to the tool wall.

3 Claims, 1 Drawing Sheet

METHOD FOR TEMPERING AN INJECTION MOLDING TOOL

BACKGROUND OF THE INVENTION

1. Technical Field of the Invention

The invention is directed to a method for tempering a injection molding tool and to a injection molding tool or sensor arrangement for performing the method.

2. Prior Art

Various guidelines exist for the thermal design of injection molding tools. Conventionally, with respect to the disposition of cooling conduits, it is assumed that the heat flux that results from the thermal energy of the part being molded must be carried away, within the cycle time of each injection molding cycle, into the cooling conduits disposed parallel to the mold recess (cavity) that receives the part to be molded.

It is understood that this thermal energy of the part to be molded is given off in equal parts from the center of the part to be molded to the surrounding contact surfaces of the tool.

Such a design does not, however, take into account the fact that a gap can form because of the shrinkage of the part to be molded upon cooling of the melt, so that in the region of the gap a severely reduced heat transfer to the surface of the cavity takes place, while conversely an increased proportion of heat is transmitted to the opposite side, since there the part to be molded shrinks onto the mold, resulting in an increased heat transfer.

Since in the known arrangements, the cooling conduits are designed such that they each receive only the proportion of the quantity of heat to be allocated to them at right angles to the mold recess surface, or in other words, the half corresponding to one half of the mold recess, heating of certain regions of the tool can occur, namely where the gap has formed or in tool regions remote from the cooling conduits, causing a heat buildup which in turn causes delayed solidification of the molded part that has just been injection molded. Moreover, stresses arise in the molded part as a result of a different temperature level that comes to be established in the cavity.

It must also be taken into account that different heat transfer coefficients result, especially upon cooling in which the coolant medium moves in a pulsed fashion, and not continuously, controlled by valves, through the cooling conduits. This result occurs on the one hand for flowing water or coolant during the cooling pulse and on the other for standing coolant. These heat transfer coefficients differ considerably. Aside from the geometric aspects mentioned, the result of this, can be that the process heat to be dissipated cannot be carried away with only a single cooling pulse at the beginning of the injection cycle but instead, as known per se from German Patent DE 43 09 880 C2, must follow additional cooling pulses at the end of the injection cycle. This is especially correct if the sensor can only be disposed farther from the cavity or at some point that is uniformly affected thermally by both the injected melt and the cooling. This in turn can mean that toward the end of the injection cycle, cold zones arise at the surface of the cavity, and as a result once again an uneven temperature level can arise, the consequence of which is shrinkage and warping.

OBJECT AND SUMMARY OF THE INVENTION

Taking this as the point of departure, the object of the invention is to create a method and an injection molding tool by which a controlled dissipation of heat from the injection molding composition can be accomplished, so that temperature differences in the mold recess are avoided and cooling is even better synchronized with the injection cycle. Moreover, the thermal energy from the melt is to be reliably dissipated both from cavity regions remote from the cooling conduits and from tool regions that have increased heat production during the cycle time. Furthermore, the passage of the heat from the tool wall to the cooling conduit is to be synchronized with the heat transfer from the cooling conduit surface to the coolant medium.

According to the invention, this object is attained in that the cooling conduits are positioned parallel relative to the closest wall of the mold recess in such a way that the thermal energy to be dissipated in the molding cycle, resulting from the sum of the thermal energy of the part to be molded and heat exchange with the surroundings of the tool and the externally supplied energy, can be carried away maximally in the time of the heat transfer from the melt to the tool wall. In other words, the maximum part (majority) of the heat is carried away within the cycle time.

Preferably, the dimensioning is selected such that the heat dissipation is effected in half the injection cycle time.

With respect to the residual thermal energy to be dissipated, it should be noted that the thermal energy of the part being molded is composed of the difference between the enthalpy of injection and the enthalpy of unmolding, and that in the heat exchange with the surroundings of the tool, convection, radiation and heat conduction must all be taken into account. As to externally supplied energy, the energy supplied or dissipated by a medium and a thermal energy from electric heating should be taken into account.

For performing this method, an injection molding tool is used that has at least one temperature sensor, which is disposed at approximately the same distance from the closest cooling conduit as the distance by which this cooling conduit is spaced apart from the closest mold wall, but laterally offset outside the normal from the cooling conduit to the closest mold wall portion. Because of the disposition of the cooling conduits and of the sensor, it becomes possible, after a cooling pulse has taken place, with standing water, for the thermal energy to be carried away, from regions having heat buildup and from the tool region remote from the cooling conduits, into the coolant medium within the injection cycle. The molding tool according to the invention assures that the heat passage and the transfer of the residual thermal energy into the coolant medium take place synchronously.

BRIEF DESCRIPTION OF THE DRAWINGS

The invention will be described in further detail below in terms of a preferred exemplary embodiment of an injection molding tool.

DETAILED DESCRIPTIONS OF THE PREFERRED EMBODIMENT OF THE INVENTION

Figures 1, 2:
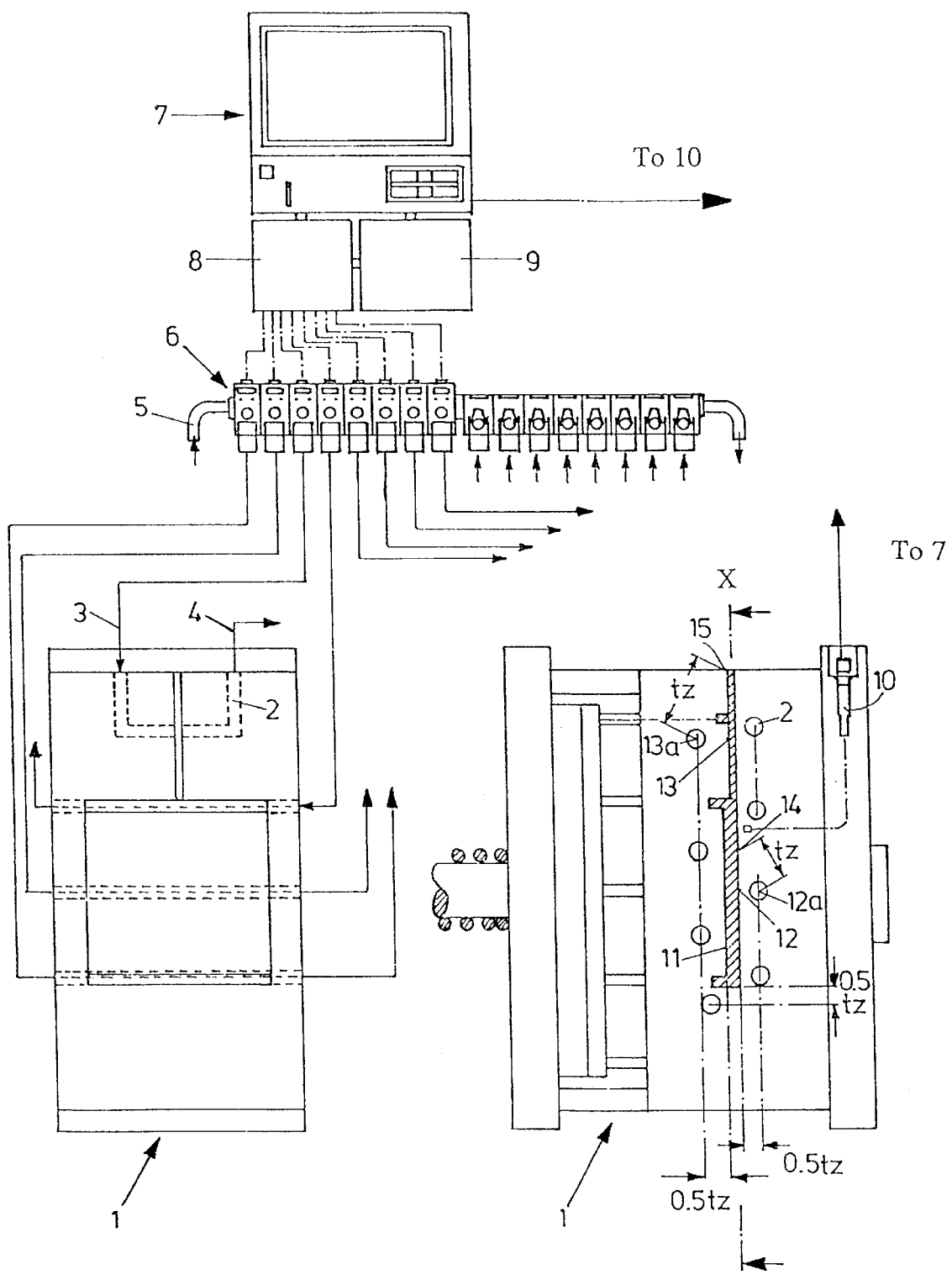
FIG. 1 of the drawings shows a block circuit diagram of an injection molding tool along section x—x of FIG. 2 with the associated control and distributor device.
FIG. 2 shows an elevation view of the injection molding tool of FIG. 1.

The drawing shows an injection molding tool 1 with a plurality of cooling conduits 2; each cooling conduit has an inlet 3 and an outlet 4.

The coolant water supplied via the inlet 3 is fed via a central line 5, and distributed to the various cooling conduits 2 via a distributor arrangement 6, with respective downstream switching valves, in pulsed fashion synchronously with the applicable injection cycle and with a defined pulse duration.

Triggering of the distributor arrangement 6 is effected via a control device 7, which is subdivided into a control device 8 having a separate microprocessor for cooling and a control device 9 having a second separate microprocessor for heating.

At least one temperature sensor 10, which is disposed in the injection molding tool 1, is connected to the control device 7.

As can be seen from the lower right portion of the drawing, the injection molding tool 1 has a mold recess or cavity 11, and the cooling conduits 2 extend along both sides of it.

As can be seen from the drawing, the cooling conduits extend parallel to one another and parallel to the respective adjacent wall 12 of the mold recess. They are positioned such that the spacing distance 0.5 tz to the respective parallel cooling conduit is such that the passage of thermal energy from the tool wall regions, for instance at 12 and 13, to the cooling conduit surfaces 12a and 13a is dissipated within the time of the heat transfer from the melt to the tool wall, and preferably in half the cycle time. At the same time they are arranged such that the spacing tz from the respective cooling conduit, for instance as at 12a and 13a at the region farthest away from the mold recess 14 and 15 is such that, the time of the heat transfer to the medium is concluded prior to the next injection, or in other words by the end of the cycle time.

I claim:

1. A method for tempering an injection molding tool having a plurality of cooling conduits by properly locating and distributing these cooling conduits, wherein a coolant liquid can be introduced in controlled fashion, wherein the injection molding tool has a mold recess formed by an inner tool wall, into which a melt of molding composition is injected during an injection cycle of a molding cycle, said molding cycle comprising said injection cycle, a cycle of heat transfer from the melt to the tool wall, an opening cycle, an ejection cycle, and a closing cycle, comprising the steps of positioning cooling conduits parallel relative to a closest wall of the mold recess;

calculating the thermal energy to be dissipated in said injection cycle from the sum of thermal energy possessed by said melt, heat exchange with the surroundings of the tool, and externally supplied energy;

calculating the time required for heat to transfer from said melt to said inner tool wall;

calculating the time of heat transfer from a point of said inner tool wall to two neighboring cooling conduits, said point being chosen such that it has the same maximum distance to said cooling conduits; and positioning the cooling conduits at such a distance from the mold recess that the thermal energy calculated can be transferred from the mold recess to coolant medium carried by said cooling conduits and thus can be carried away by the coolant medium within a time period that is no longer than said cycle time.

2. The method of claim 1, characterized in that the dimensioning is selected such that the heat dissipation is effected in half the injection cycle time or less.

3. A method for tempering an injection molding tool including a mold cavity defined by a wall and a plurality of cooling conduits, preparatory to constructing said injection molding tool with said cooling conduits optimally positioned relative to said cavity, said method comprising from the sum of thermal energy possessed by a molten composition within said cavity, heat exchange with ambient environment of said tool, and externally supplied energy, determining the total thermal energy to be dissipated during injection of a molten composition into said cavity;

determining the time required for heat to transfer from said molten composition to said tool wall;

determining the time for heat to transfer from a point of said tool wall to two neighboring cooling conduits, said point being chosen such that it has the same maximum distance to said cooling conduits; and positioning said cooling conduits at such a distance from the mold cavity that the thermal energy determined can be transferred from the mold cavity to a cooling medium carried by said cooling conduits within a time period that is no longer a complete molding cycle, said complete molding cycle comprising a total of a term during which said injection takes place, a term of heat transfer from the melt to the tool wall, a cavity opening term, an ejection term and a closing term.

* * * * *